No. 722,262. PATENTED MAR. 10, 1903.
R. STONE.
MOTOR VEHICLE.
APPLICATION FILED AUG. 1, 1902.
NO MODEL.
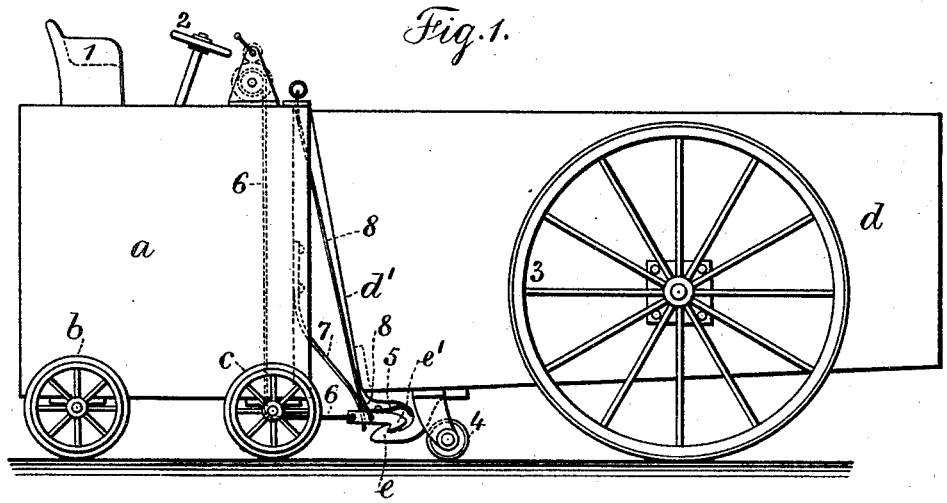
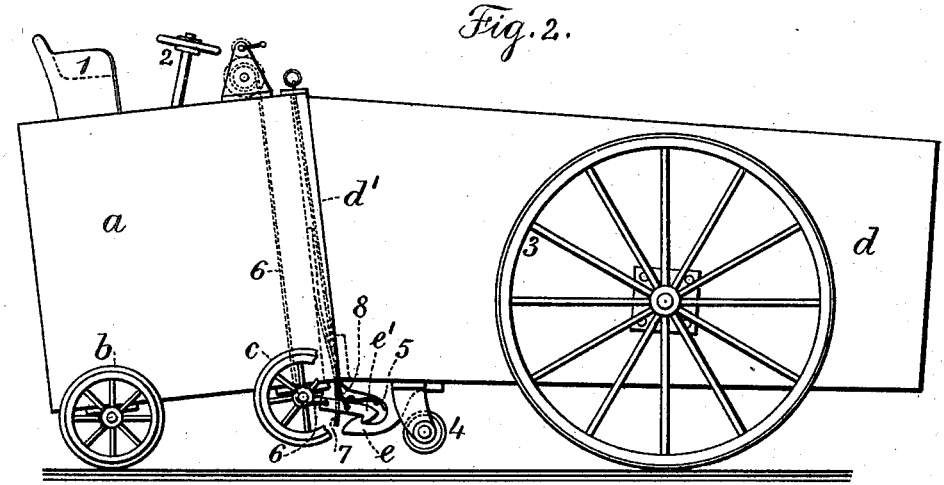
Witnesses
J. Staib
Chas. H. Smith
Inventor:
Roy Stone
per L. W. Serrell & Son
Attys.

UNITED STATES PATENT OFFICE.

ROY STONE, OF NEW YORK, N. Y.

MOTOR-VEHICLE.

SPECIFICATION forming part of Letters Patent No. 722,262, dated March 10, 1903.

Application filed August 1, 1902. Serial No. 117,932. (No model.)

*To all whom it may concern:*

Be it known that I, ROY STONE, a citizen of the United States, residing in the borough of Manhattan, city, county, and State of New York, have invented an Improvement in Motor-Vehicles, of which the following is a specification.

Motor-vehicles, such as trucks and wagons, for the delivery of merchandise and as heretofore employed have not been economical in time or in expense, as the vehicle with the attached motor structure is required to wait while being loaded with merchandise and also while being unloaded. This disadvantage it is the object of my invention to prevent.

I provide a motor-vehicle barely larger than sufficient to receive and contain the power mechanism, together with trucks or merchandise-vehicles adapted to be readily and almost automatically attached to and detached from said motor-vehicle, both vehicles to be self-supporting on wheels. One motor-vehicle will answer for several merchandise-vehicles by moving a loaded vehicle to a place of destination, leaving it to be unloaded, taking back an empty or loaded vehicle and leaving it to be loaded or unloaded, as the case may be, and taking away a vehicle loaded in the interim. I prefer the motor-vehicle to have four wheels, in two pairs, and the merchandise-vehicle to have one pair of wheels and a trailer or caster wheel adapted normally to support the vehicle while being loaded or unloaded with merchandise. I employ coupling devices part of which are attached to the motor-vehicle and part to the merchandise-vehicle, and one end of one vehicle, where the ends come together, is to be made at an obtuse angle to the base of the vehicle, so that when the ends are connected by the coupling and are forcibly drawn together the forward wheels of the motor-vehicle and the trailer or caster wheel of the merchandise-vehicle will be lifted off the ground, the connected combined vehicle being thereafter and while in transit supported by the driven and steering wheels of the motor portion and the main wheels of the merchandise portion.

In the drawings, Figure 1 is an elevation of the motor and merchandise vehicle in the act of being connected. Fig. 2 shows the vehicles connected and the adjacent wheels as lifted off the ground.

The drawings are simply illustrative of possible structures and are not intended to be strictly accurate in structure.

$a$ represents the motor-vehicle; $b$, the power and steering wheels; $c$, fixed supporting-wheels; 1, a seat, and 2 a steering-handle. This device may be of any suitable form.

$d$ represents the merchandise vehicle or truck; 3, the supporting-wheels; 4, a trailer or caster wheel or wheels. The end $d'$ of the merchandise-truck $d$ is shown as inclined—that is, set at an obtuse angle to the bottom or base line of the merchandise-truck.

$e\ e'$ represent the parts of a coupling device, the part $e$ being in the form of a downward and rearward extending hook having a base portion secured firmly to the bottom of the merchandise-truck. The part $e'$ is in the form of a hook adapted to engage the hook part $e$ of the coupling, and to this part $e'$ is secured a spring 5, and a rope 6 extends therefrom through the body of the motor-vehicle and to a windlass or winding structure that may be placed on the top thereof adjacent to the motorman.

7 represents a blade-spring secured to the forward face of the motor-vehicle and extending downward and through a mortise in the part $e'$ of the coupling, and 8 represents a lifting rope or chain, at one end secured to the part $e'$ of the coupling and at the other end passing through an aperture in a part of the motor-vehicle adjacent to the motorman. The rope or chain 8 supports the coupling $e'$. The spring 7 imparts location to said part and tends to hold the same forward of the motor-vehicle. The rope 6 applies a tension against the action of the spring 7, and the spring 5, when the parts of the coupling come together, forces the hook end of the part $e'$ into engagement with the hook end of the part $e$.

As represented in Fig. 1, the merchandise-truck $d$ may be considered as loaded and the motor-vehicle as having come up to the end of the merchandise-truck sufficient for the parts of the coupling to come into engagement. From this position the windlass is actuated and the rope 6 drawn upon to move the coupling device nearer to the motor-vehicle and in so doing bring the adjacent faces or ends of the motor-vehicle and the merchandise-truck into full and complete contact. This contact is shown in Fig. 2, wherein because of the obtuse inclined end of the merchandise-truck the wheels $c$ and 4 of the parts of the vehicle are lifted off the ground, and the entire weight of the connected devices is supported upon the wheels 3 of the truck $d$ and the power and steering wheels $b$ of the motor-vehicle. According to the position illustrated in Fig. 2, the connected parts are adapted to move together, the motor-vehicle pushing the merchandise-truck before it in any desired direction—such, for instance, as from the place of loading to the place of delivery or from the place of unloading to the place of reloading. In this manner one motor-vehicle is adapted to serve a number of trucks. The parts are readily attached and detached. In detaching the one from the other the rope or chain 6 is released from the windlass and the parts permitted to settle to the ground, as in Fig. 1. Then the rope or chain 8 is pulled upon to raise the coupling portion $e'$ from the coupling portion $e$ and in so doing press down the spring 5. As soon as separated the motor-vehicle is free to be attached to another truck for service, as hereinbefore stated.

I claim as my invention—

1. The combination with a motor-vehicle, of a merchandise truck or wagon, a means for connecting and disconnecting the same and for changing the relation of the parts as connected so that the adjacent wheels of the respective vehicles are raised clear from the ground.

2. The combination with a motor-vehicle, of a merchandise truck or wagon having one end formed at an obtuse angle to the base-line or bottom of the vehicle, means for connecting and disconnecting the motor-vehicle and merchandise-truck and for holding the same in a fixed relation to one another whereby when in such fixed relation with the abutting ends in contact the adjacent wheels are raised clear from the ground.

3. The combination with a motor-vehicle having rear power and steering wheels and forward supporting-wheels, of a merchandise truck or wagon having main supporting-wheels, and a trailer or caster wheel, and one end formed at an obtuse angle to the base-line or bottom of the vehicle, a coupling device, part of which is on the motor-vehicle and part on the merchandise truck or wagon, means for supporting part of the coupling device, means for disconnecting the same, and means for drawing together the adjacent ends of the motor-vehicle and merchandise truck or wagon and holding the same together with force and at the same time raising the supporting-wheels and the caster-wheels of the respective parts clear of the ground.

Signed by me this 24th day of July, 1902.

ROY STONE.

Witnesses:
ARTHUR H. SERRELL,
BERTHA M. ALLEN.